United States Patent Office 3,097,100
Patented July 9, 1963

3,097,100
THIAZOLIDONES AS LIGHT STABILIZERS FOR PLASTIC COMPOSITIONS
Gerald R. Lappin and John W. Tamblyn, Kingsport, Tenn., and James A. Van Allan, Rochester, N.Y., assignors to Eastman Kodak Company, Rochester, N.Y., a corporation of New Jersey
No Drawing. Filed Jan. 25, 1960, Ser. No. 4,174
6 Claims. (Cl. 106—176)

This invention relates to light stabilizers for plastic compositions, more particularly plastic compositions such as polyesters.

Many organic plastic compositions undergo deterioration of one sort or another when exposed to sunlight due to the action of ultraviolet light. Conventional stabilizers such as phenyl salicylate, protect some plastics quite effectively against damage from radiation wave lengths below about 3400 A. Certain benzothiazole and benzothiazoline derivatives behave much like phenyl salicylate in this respect. However, radiation of longer wave lengths is not without harmful effects on many plastics and there has been a need for protection over a wider range.

One object of this invention is to provide a light stabilizer for plastic compositions which gives improved protection in the near ultraviolet range. A further object of this invention is to provide an ultraviolet stabilizer which has good compatibility and gives substantial protection against ultraviolet radiation to polyesters. A further object of this invention is to provide an ultraviolet inhibitor which is free from color change when incorporated into plastic materials.

We have found that certain derivatives of 4-thiazolidone absorb strongly in the near ultraviolet and also give surprisingly good protection against ultraviolet damage when incorporated in plastics. These thiazolidones are prepared by refluxing equimolecular amounts of the thiourea, ethyl chloroacetate, and pyridine in alcohol for 3 to 5 hours as follows:

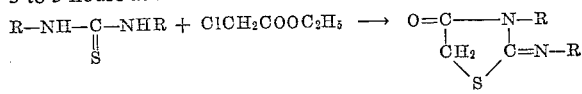

This thiazolidone is condensed with an aromatic aldehyde using piperidine as a catalyst as follows:

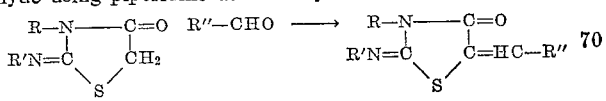

A general formula for the compounds which are operative in our invention has the following configuration:

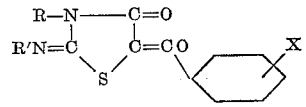

The range of derivatives is illustrated as follows in Table I and shows the appropriate structure for R, R' and X. The ultraviolet absorption data were obtained on methanol solutions of the compounds.

TABLE I

| R | R' | X | Chemical analysis | | | | Wavelength at maximum absorption, $\lambda(m\mu)$ | Molar extinction coefficient, $\epsilon \times 10^{-4}$ |
|---|---|---|---|---|---|---|---|---|
| | | | Calc. | | Obs. | | | |
| | | | Percent C | Percent H | Percent C | Percent H | | |
| $C_2H_5$ | $C_6H_5$ | H | | | | | 330 | 2.6 |
| $C_6H_5$ | $C_6H_5$ | H | | | | | 330 | 2.6 |
| n-$C_6H_{13}$ | $C_6H_5$ | 2—O$CH_3$ | 68.1 | 7.0 | 68.3 | 6.9 | 355 | 2.3 |
| n-$C_{16}H_{33}$ | $C_6H_5$ | H | 75.8 | 9.7 | 75.7 | 8.9 | 330 | 2.88 |
| ⟨⟩—$CH_3$ | ⟨⟩—4—$CH(CH_3)_2CH_3$ | | 76.0 | 6.1 | 75.9 | 6.0 | 339 | 3.0 |
| ⟨⟩—$C_2H_5$ | ⟨⟩—$C_2H_5$ | H | 75.9 | 5.8 | 76.0 | 6.3 | 330 | 2.6 |

In our preferred embodiment of this invention, a thiazolidone represented by the following general structural formula is used:

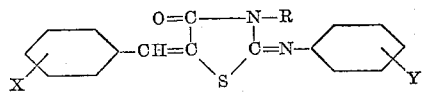

where X and Y are selected from the class consisting of alkyl groups containing one to twelve carbon atoms, alkoxy groups containing one to twelve carbon atoms, halogen, or a nitro group and R is selected from the class consisting of alkyl groups containing two to twelve carbon atoms and aryl groups substituted with groups selected from the same class as X and Y. Approximately 5% based on the weight of the plastic material of the inhibitor is incorporated into the plastic. These thiazolidones are relatively heat stable and have the advantage that they can be incorporated into a molten polyester with very little increase in color, whereas certain other ultraviolet inhibitors result in considerable coloration under similar treatment.

The following examples are intended for illustration of our invention but are not intended to limit it in any way:

Example 1

Preparation of 3-anisyl-2-anisylimino-5-anisylidene-4-thiazolidone.—A mixture of 61 g. (0.5 mole) of p-anisidine, 57 g. (0.75 mole) of carbon disulfide, and 10 g. of powdered potassium hydroxide was refluxed 6 hours. After cooling the mixture was acidified with 6 N hydrochloric acid, filtered, washed with water and methanol, and dried in a vacuum oven at 60° C. There was obtained 68 g. (95%) of 4,4'-dimethoxythiocarbanilide, melting point 187–189° C.

A mixture of 28.8 g. (0.1 mole) of the above product, 24 g. (0.2 mole) of ethyl chloroacetate, 17 ml. of pyridine, and 500 ml. of ethanol was refluxed 20 hours.

After cooling the mixture was diluted with 1 liter of water and filtered. The product was recrystallized from ethanol to give 30 g. (90%) of 2-anisyl-3-anisylimino-4-thiazolidone, melting point 116–117° C.

A mixture of 16.4 g. (0.05 mole) of the above product, 6.8 g. (0.05 mole) of anisaldehyde, 100 ml. ethanol, and 7 ml. of piperidine was refluxed 4 hours. The mixture was cooled and filtered. The product was recrystallized from a mixture of dimethylformamide and ethanol to give 19 g. (86%) of 3-anisyl-2-anisylimino-5-anisylidene-4-thiazolidone, melting point 198–200° C.

*Example 2*

Preparation of 3-anisyl-2-anisylimino-5-benzylidene-4-thiazolidone.—A mixture of 10 g. (0.03 mole) of 3-anisyl-2-anisylimino-4-thiazolidone, prepared as in Example 1, 3.5 g. (0.03 mole) of benzaldehyde, 100 ml. of ethanol, and 5 ml. of piperidine was refluxed for 4 hours. After cooling the mixture was diluted with 25 ml. of water and filtered. The product was recrystallized from ethanol to give 10 g. (80%) of 3-anisyl-2-anisylimino-5-benzylidene-4-thiazolidone, melting point 174–175° C.

*Example 3*

Preparation of 5-benzylidene-3-hexadecyl-2-phenylimino-4-thiazolidone.—86.8 g. (0.36 mole) of hexadecylamine was dissolved in 300 ml. of hexane at 70°. The solution was stirred and to it was added dropwise 46.4 g. (0.36 mole) of phenyl isothiocyanate. After cooling the mixture was filtered and the product air-dried. There was obtained 117 g. (88%) of N-hexadecyl-N′-phenylthiourea, melting point 80–81° C.

A mixture of 116 g. (0.31 mole) of the above product, 42 g. (0.34 mole) of ethyl chloroacetate, 31 g. (0.35 mole) of pyridine, and 350 ml. of ethanol was refluxed 18 hours. After cooling, the mixture was diluted with 100 ml. of water and filtered. The product was air-dried to give 120 g. (95%) of 3-hexadecyl-2-phenylimino-4-thiazolidone, melting point 53–55° C.

A mixture of 120 g. (0.29 mole) of the above product, 38 g. (0.33 mole) of benzaldehyde, 30 g. (0.35 mole) of piperidine, and 600 ml. of methanol was refluxed 18 hours. The mixture was cooled and filtered. The product was recrystallized from acetone to give 124 g. (85%) of 5-benzylidene-3-hexadecyl-2-phenylimino-4 thiazolidone, melting point 72–74° C.

*Example 4*

Preparation of 2-phenylimino-3-phenyl-5-cumal-4-thiazolidone.—A mixture of 99 g. of thiocarbanilide and 68 g. of ethyl chloroacetate is heated to 110°; the reaction mixture becomes fluid in about 10 min. and there is a vigorous evolution of ethyl alcohol. The mixture quickly solidifies to a white crystalline mass. (This is a hydrochloride which melts at 207–210°.) It is warmed on the steam bath for one hour to complete the reaction. The crude reaction mixture is broken up, washed with benzene, and filtered. It is then stirred with sodium bicarbonate solution for one hour, filtered, and dried. (The sodium bicarbonate solution liberates the free base.) The yield of 2-phenylimino-3-phenyl-4-thiazolidone is 101 g. (86%), melting point 168–171° C. It may be recrystallized from butanol, after which its melting point is 176° C.

A mixture of 26.4 g. (0.1 mole) of 2-phenylimino-3-phenyl-4-thiazolidone and 16 g. (16.5 ml.) (0.1 mole) of isopropylbenzaldehyde in 160 ml. of methanol was brought to vigorous reflux on the steam bath. Piperidine (10 ml. in 15 ml. of methanol) was added. (Although piperidine is a catalyst, the amount used in larger reactions should be increased proportionately.) The fluid phase of the reaction mixture became lemon yellow, and some of the 2-phenylimino-3-phenyl-4-thiazolidone dissolved, but a clear solution was never obtained. (In a run using 16 g. of the thiazolidone, 15 ml. of isopropylbenzaldehyde and 10 ml. of piperidine complete solution was obtained for about 5 min. The reaction mixture set to a crystalline mass.) The yield in this case was 93% (crude). Reflux was continued for two hours. The reaction mixture was then chilled, and the product was filtered off, washed with methanol, and dried. The yield was 34 g., 87%; melting point, 172–175° C. This was dissolved in 50 ml. of warm chloroform, and 200 ml. of methanol was added. After cooling to room temperature, the product was filtered and again washed with methanol. Pure white crystals resulted. The yield was 30 g., 75%; melting point 178° C.

The stabilizers were tested by melt-compounding into the plastic composition and formed into flat sheets. In the case of cellulose acetate butyrate, one part of the stabilizer was rolled into the plastic with 12 parts dibutyl sebacate. 50-mil thick sheets were then molded at 320° F. and exposed in a modified Atlas Twin-Arc Weather-Ometer (Anal. Chem., 25, 460 (1953)). In the case of polyester made from 4,4′-sulfonyl dibenzoic acid and 1,5-pentanediol, 3 parts of the stabilizer were mixed with the powdered polymer, extruded at 575° F. in the form of sheet 30-mil thick and exposed as above.

The plastic samples, before and after exposure were tested for stiffness in flexure by the Tour-Marshall procedure (A.S.T.M. D747–43). Brittleness was defined to have developed in the exposed samples if they broke at a bend angle of less than 90° in this test. Stabilization ratings were defined as follows:

(1) Rating based on retardation of loss in flexural strength is the ratio of exposure time required to cause 25% loss of original flexural strength in the stabilized sample to the exposure time for equal loss in the unstabilized sample.

(2) Rating based on retardation of embrittlement is the ratio of exposure time for development of brittleness in the stabilized sample to the exposure time for development of brittleness in the unstabilized sample.

Some tests were also made on a more rubbery type of polyester made from an equimolar mixture of 4,4′-sulfonyl dibenzoic acid and azelaic acid, polyesterified with 1,5-pentanediol. This polymer was dissolved, with 5 parts of the stabilizer to be tested, in tetrachloroethane and cast as films about 3-mil in thickness. These films were exposed in the Weather-Ometer as above until they broke when given one hard crease, the exposed side of the film being on the outside of the crease. This was taken to be a semiquantitative standard state of brittleness. The stabilization rating for the stabilizer was then defined to be the ratio of the exposure time for development of brittleness in the stabilized film to the time for development of similar brittleness in the unstabilized film.

The thiazolidones were found to have an important advantage over many other organic light stabilizers in that they have a higher inherent heat stability. For example, they can be safely heated in aromatic sulfone polyesters at the high temperatures (about 300° C.) required in various melt-processing operations, such as polyesterification, film extruding, injection-molding, and fiber spinning.

*Example 5*

Table II gives stabilization ratings for several thiazolidone derivatives and cellulose acetate butyrate plastic sheets (13% acetyl, 38% butyryl). For the unstabilized plastic, the exposure time required to cause either embrittlement or 25% loss of flexural strength was about 300 hours in the modified Weather-Ometer.

Phenyl salicylate, a standard light stabilizer for cellulose esters has been included in Table II for comparison. In addition to the thiazolidones, three other thiazole derivatives approximately equivalent to phenyl salicylate in stabilizing activity have also been included. At the selected concentration of 1%, certain of these thiazolidones are shown to provide substantially improved protection over that obtainable with phenyl salicylate or equivalent stabilizers.

TABLE II

| Stabilizer | Stabilization rating based on retardation of— | |
|---|---|---|
| | Flexural strength loss | Embrittlement |
| None | 1 | 1 |
| Phenyl salicylate | 5 | 5 |
| 2-phenylimino-3-phenyl thiazolidine | 4 | 4 |
| 2-(N-ethyl-m-toluidino) benzothiazole | 4 | 4 |
| 2-phenylimino-3-ethyl benzothiazoline | 5 | 5 |
| 2-phenylimino-3-phenyl-4-thiazolidone | 3 | 2 |
| 2-phenylimino-3-phenyl-5-fural-4-thiazolidone | 5 | 5 |
| 2 - phenetylimino - 3 - phenetyl - 5 - benzal - 4 - thiazolidone | 6 | 6 |
| 2-phenylimino-3-phenyl-5-cumal-4-thiazolidone | 7 | 6 |
| 2-(p-tolylimino)-3-(p-tolyl)-5-cumal-thiazolidone | 9 | 8 |
| 2-(o-tolylimino)-3-(o-tolyl)-5-cumal-4-thiazolidone | 12 | 11 |
| 2-(o-tolylimino)-3-(o-tolyl)-5-benzal-4-thiazolidone | 15 | 15 |

Example 6

The superiority of the thiazolidones over the salicylate type of stabilizers was even more pronounced in the case of the pentamethylene 4,4'-sulfonyl dibenzoate polymer, as shown in Table III. Exposure time required for 25% loss of flexural strength in the case of the unstabilized plastic was about 300 hours in the modified Weather-Ometer. Brittleness developed in this material in about 200 hours. The three thiazole derivatives, included in Example 1 with phenyl salicylate were also tested in the sulfone polyester and are included with Table III. It may be noted that these compounds not only failed to give any protection but actually accelerated ultraviolet breakdown of the plastic. This is shown by the fractional values for the stabilization ratings.

TABLE III

| Stabilizer | Stabilization rating based on retardation of— | |
|---|---|---|
| | Flexural strength loss | Embrittlement |
| None | 1.0 | 1.0 |
| 2-Phenylimino-3-phenyl thiazolidine | 0.8 | 0.8 |
| 2-(N-ethyl-m-toluidino) benzothiazole | 0.4 | 0.5 |
| 2-phenylimino-3-ethyl benzothiazoline | 0.4 | 0.5 |
| 2-phenylimino-3-hexyl-5-(2,6-dichlorobenzal)-4-thiazolidone | 1.0 | 1.0 |
| 2-phenylimino-3-hexyl-5-(o-methoxybenzal)-4-thiazolidone | 10 | 2 |
| 2-phenylimino-3-phenyl-5-benzal-4-thiazolidone | 10 | 8 |
| 2-phenylimino-3-phenyl-5-(m-hydroxy benzal)-4-thiazolidone | 4 | 7 |
| 2-(o-tolylimino)-3-(o-tolyl)-5-cumal-4-thiazolidone | 6 | 12 |
| 2-phenylimino-3-phenyl-5-cumal-4-thiazolidone | 9 | 10 |
| 2-hexylimino-3-hexyl-5-(o-methoxy benzal)-4-thiazolidone | 10 | 12 |
| 2-(o-ethylphenylimino)-3-(o-ethylphenyl)-5-benzal-4-thiazolidone | 10 | 12 |

Example 7

The well known light stabilizer, 2-hydroxy-4,4'-dimethoxy benzophenone, was incorporated with the sulfone polyester of Example 2, before the polyesterification state. The polymer was then formed in the presence of the stabilizer and the product extruded in the form of 30-mil thick film in the same way as the test samples of Example 2. Considerable discoloration of stabilizer took place during these heat treatments. Stabilization ratings on this film were 1.0 and 0.9 respectively for flexural strength loss and embrittlement. A film similarly prepared containing 2-phenylimino-3-phenyl-5-cumal-4-thiazolidone, on the other hand, showed no discoloration and gave stabilization ratings of greater than 14.

This ability of the thiazolidones to withstand high processing temperatures without color deterioration or loss of stabilizing activity is highly advantageous. The stabilizing activity of any stabilizer is improved with increased intimacy of dispersion. The latter can be attained best by incorporating the stabilizer before polymerization. This procedure usually involves considerably more exposure of the stabilizer to high temperatures.

Example 8

Thin films of the more rubbery sulfone polyester, described above, were also well stabilized by addition of thiazolidones, as shown by Table IV. Several of the salicylate types of stabilizer and also 2-phenylimino-3-phenyl thiazolidine, are included for comparison. It may easily be seen how much superior is the performance of many of the thiazolidones. In these tests the unstabilized film became brittle after about 40 hours' exposure in the modified Weather-Ometer.

TABLE IV

| Stabilizer: | Stabilization rating [1] |
|---|---|
| None | 1.0 |
| Phenyl salicylate | 1 |
| Resorcinol monobenzoate | 2 |
| Resorcinol monosalicylate | 3 |
| 2-phenylimino-3-phenyl thiazolidine | 1 |
| 2-amino thiazoline | 1 |
| 2-butylimino-3-butyl-4-thiazolidone | 1 |
| 2-phenylimino-3-butyl-4-thiazolidone | 3 |
| 2-phenylimino-3-phenyl-4-thiazolidone | 3 |
| 2-phenylimino-5-benzal-4-thiazolidone | 6 |
| 2 - phenylimino - 3 - phenyl - 5 - benzal - 4 - thiazolidone | 8 |
| 2 - phenylimino - 3 - phenyl - 5 - anisal - 4 - thiazolidone | 10 |
| 2-phenylimino-3-ethyl-5-benzal-4-thiazolidone | 11 |
| 2 - o - ethylphenylimino - 3 - o - ethylphenyl - 5 - benzal-4-thiazolidone | 11 |
| 2 - phenylimino - 3 - hexyl - 5 - (o - methoxybenzal)-4-thiazolidone | 11 |
| 2-(p-tert-butyl phenoxy phenylimino)-3-(p-tert-butyl phenoxyphenyl) - 5 - benzal - 4 - thiazolidone | 11 |
| 2 - (o - tolylimino) - 3 - (o - tolyl) - 5 - benzal-4-thiazolidone | 19 |
| 2 - phenylimino - 3 - phenyl - 5 - (p - nitrobenzal)-4-thiazolidone | 22 |
| 2-anisylimino-3-anisyl-5-benzal-4-thiazolidone | 24 |
| 2-anisylimino-3-anisyl-5-anisal-4-thiazolidone | 24 |

[1] Based on retardation of embrittlement.

Example 9

Two of the films listed in Table IV of Example 8 were exposed outdoors in Kingsport, Tennessee, for two clear days in September 1954. These films were the unstabilized control and the film stabilized with 2-o-tolylimino-3-o-tolyl-5-benzal-4-thiazolidone. The deterioration due to weathering was evaluated for both films by measurement of their inherent viscosity before and after exposure. The loss of inherent viscosity was found to be, respectively, 40% and 0.9%. Inherent viscosity for both films before exposure was about 0.95.

In general, for this material, loss of inherent viscosity on weathering was found to run parallel with development of brittleness. Samples usually became brittle when the viscosity loss was about 40%. According to this measure, the thiazolidone-stabilized film was some 40 times as weather-resistant as the unstabilized control.

The inherent viscosities were measured at 25° C. on solutions of the polyester samples in a 60:40 (by weight) mixture of phenol and tetrachloroethane, containing 0.25 g. of the polyester per 100 cc. of the solvent. The inherent viscosity was defined to be $$\frac{\ln N_r}{c}$$

where $N_r$, the relative viscosity, is the ratio of viscosity of the solution to viscosity of the solvent and $c$ is 0.25.

*Example 10*

A polyester made of a mixture of 0.83 mole of 4,4'-sulfonyl dibenzoic acid and 0.17 mole of succinic acid with 1.00 mole of 1,5-pentanediol was melt-spun into 3-denier yarn filaments. The same polyester was first mixed with small percentages of various thiazolidones and then melt-spun as before. The unstabilized and stabilized yarns were exposed in the Weather-Ometer until they had lost 25% of their original tenacity. Table V records the exposure times required to cause this amount of degradation.

TABLE V

| Stabilizer | Concentration of stabilizer (percent) | Exposure time for 25% loss of tenacity (hours) |
|---|---|---|
| None | | 4.5 |
| 2-phenylimino-3-phenyl-4-thiazolidone | 2 | 13 |
| 2-phenylimino-3-butyl-5-benzal-4-thiazolidone | 2 | 14 |
| 2-phenylimino-3-butyl-5-benzal-4-thiazolidone | 5 | 54 |
| 2-(o-ethyl phenylimino)-3-(o-ethyl phenyl)-5-benzal-4-thiazolidone | 2 | 11 |
| 2-(o-ethyl phenylimino)-3-(o-ethyl phenyl)-5-benzal-4-thiazolidone | 5 | 19 |
| 2-Anisylimino-3-anisyl-5-benzal-4-thiazolidone | 4 | 16 |
| 2-phenylimino-3-hexadecyl-4-thiazolidone | 4 | 11 |
| 2-phenylimino-3-hexadecyl-5-benzal-4-thiazolidone | 2 | 14 |
| 2-phenylimino-3-hexadecyl-5-benzal-4-thiazolidone | 5 | 21 |

It is evident that plastic shapes even as thin as yarn filaments can be given a substantial degree of protection against damage from ultraviolet light.

*Example 11*

The thiazolidones can be applied to the yarn after spinning, for example, from a dye-bath. A sample of fabric woven from the unstabilized yarn of Example 10 was immersed in a water bath at 90° C. 2-phenylimino-3-phenyl-5-cumal-4-thiazolidone was dispersed in the bath to the extent of 2% based on the fabric weight. Sodium lignin sulfonate and Igepon T were used as dispersing and wetting aids. The fabric was then washed, dried, and exposed in a Fade-Ometer until it lost 25% of its original tenacity. A control sample of the unstabilized fabric was similarly treated but with the thiazolidone omitted from the water bath. This fabric lost 25% of its original tenacity after 26 hours in the Fade-Ometer while the stabilized fabric required 65 hours to reach the same stage of deterioration.

*Example 12*

Table VI gives the results of stabilizing polypropylene with 5-benzal-3-hexadecyl-2-phenylimino-4-thiazolidone.

TABLE VI

| Stabilizer | Concn. of stabilizer (percent by weight) | Percent initial flexural strength left after 450 hours' exposure | Percent initial inherent viscosity left after 95 hours' exposure | Exposure time required to crack on crease (hr.) | Exposure time required to break on crease (hr.) |
|---|---|---|---|---|---|
| None | | 0 | 23 | 75 | 150 |
| 5-benzal-3-hexadecyl-2-phenylimino-4-thiazolidone | 1 | 70 | 70 | 250 | 450 |

Weathering exposures were made in an Atlas Twin-Arc Weather-Ometer modified by the addition of fluorescent sun lamps as described in "Analytical Chemistry," vol. 25, 460 (1953).

*Example 13*

The effectiveness of derivatives of 4-thiazolidone in suppressing the photo-oxidation of polyethylene is indicated from Table VII. The concentration of stabilizer was 1% by weight. Plates 1/16 inch thick were exposed outdoors from May to September. Carbonyl contents of these plates were measured before and after exposure and the carbonyl formed by photo-oxidation, obtained by difference is expressed in arbitrary units.

TABLE VII

| Stabilizer: | Carbonyl formation (arbitrary units) |
|---|---|
| None | 55 |
| 3-phenyl-2-phenylimino-5-(m-undecylcarbamoyloxy)benzal-4-thiazolidone | 6 |
| 5-benzal-3-cetyl-2-phenylimino-4-thiazolidone | 4 |

*Example 14*

Polyethylene was hot-roll compounded with 1% concentration of stabilizer and compression molded into 1/16 inch thick plates. A similar plate without any added stabilizer was used as a control. Ten samples, 1½ x ½ inch were diced out from the compression-molded sheets, bent into a U shape and held in this position in aluminum channels during exposure. The stressed portion of each sample was mounted facing the light. Exposure time required to crack half the samples was recorded as the measure of the stress-cracking resistance. The samples were exposed outdoors for a period beginning May 17, 1955.

TABLE VIII

| Stabilizer | Stress-cracking resistance, exposure time (days) required to crack | | |
|---|---|---|---|
| | 1 sample | 5 samples | 10 samples |
| None | 160 | 170 | 330 |
| 5-(p-methoxybenzal)-3-(p-methoxyphenyl)-2-(p-methoxyphenylimino)-4-thiazolidone | 395 | 400 | 410 |
| 3-phenyl-2-phenylimino-5-(m-undecylcarbamoyloxy)benzal-4-thiazolidone | 445 | 460 | 470 |
| 5-benzal-3-cetyl-2-phenylimino-4-thiazolidone | 1,150 | 1,176 | 1,261 |
| 3-hexyl-5-(o-methoxybenzal-2-phenylimino-4-thiazolidone | 741 | 765 | 1,113 |

As shown in Table VIII, two of the thiazolidones prevented cracking in all ten specimens of stressed polyethylene for over 2 years.

*Example 15*

A polyester made from a mixture of 0.83 mole terephthalate acid, 0.17 mole of isophthalic acid and 1.0 mole of 1,4-cyclohexanedimethanol was extruded at 300° C. into a film 10 mil. thick. Samples of this film were exposed in the modified Atlas Weather-Ometer described above, and the progress of weathering damage was followed by determining inherent viscosity as described in Example 9. After 850 hours of exposure, this film lost 33% of its original viscosity. The same polyester, which was mixed with 1% of 3-hexadecyl-2-phenylimino-5-benzal-4-thiazolidone, extruded and exposed in the same way, showed a viscosity loss of 16%. Substitution of 3-anisal-2-anisylimino-5-benzal-4-thiazolidone for the thiazolidone named above gave a film which lost only 10% of its original viscosity after the same Weather-Ometer exposure.

The control film became dull on the surface after 400 hours' exposure and brittle after 1400 hours' exposure. The film containing 1% of 3-anisyl-2-anicylimino-5-benzal-4-thiazolidone was still not brittle after 4500 hours' exposure. It retained a glossy surface up to 1600 hours' exposure.

*Example 16*

Injection-molded tensile bars, 1/16 inch thick, were prepared from a polyester made from a mixture of 30 mole percent terephthalic acid, 20 mole percent succinic acid, and 50 mole percent 1,4-cyclohexanedimethanol. When these specimens were exposed in the modified Atlas Weather-Ometer they became brittle in 600 hours. Similar specimens containing 1% of 5-benzal-3-(2-ethylphenyl)-2-(2-ethylphenylimino)-4-thiazolidone were still not brittle after 4700 hours. A similar improvement in the weathering resistance of a composition pigmented with 6% of a fine particle-size calcium carbonate (Multiflex MM) was obtained by the addition of 1% of the above thiazolidone.

*Example 17*

Compression-molded sheets of poly(vinyl chloride), 50-mil thick, plasticized with 30 pts. dioctyl phthalate were exposed outdoors. They darkened in color to a light brown in 2 months and to a dark brown with dulled surface in 3 months. Surface cracks developed in 1 year. Similar sheets containing in addition 4 pts. of an epoxy stabilizer, hydroquinonebisglycidyl ether, also darkened in color on exposure but more slowly than the unstabilized composition. They retained a smooth glossy surface for 1 year. By 15 months whitish streaks had developed on the surface. A third composition stabilized with 2 pts. of hydroquinonebisglycidyl ether and 2 pts. of 2 - anisylimino-3-anisyl-5-p(β-hydroxyethoxy)benzal-4-thiazolidone was also exposed in the same way and at the same time as the first two compositions. The original yellow color of this third composition darkened only slightly during exposure and is still only a yellow color after 2 years' exposure. It retained a shiny surface for over a year.

*Example 18*

Low density (0.918) polyethylene was compression-molded to plates 1/8 inch thick which were cut into test specimens 1½ x ½ inch. Ten of these specimens were bent into a U-shape and exposed outdoors under the stress required to retain them in this shape. The exposure time required to start cracks in half of these bent specimens (stress-crack life) was recorded. Similar exposures were made on polyethylene compositions containing 1% of various 4-thiazolidone derivatives. Table IX gives the results. It is apparent that a substituent in the 5-position on the thiazolidone molecule is necessary for stabilization. For good stabilization an aromatic substituent in the 5-position appears to be necessary, although insufficient.

Retention of elongation after 1 year's outdoor exposure of the above polyethylene compositions in 50-mil thick compression-molded sheets, cut into tensile specimens, is also shown in Table IX. The results run more or less parallel with the stress cracking resistance. The resistance of the same sheets to photo-oxidation in terms of carbonyl formation after 3 months' outdoor exposure is given in the last column of Table IX. The carbonyl contents of the samples, before and after exposure, were measured by means of infrared absorption at 5.82μ. The changes in carbonyl content during exposure are somewhat less informative than the changes in the mechanical properties because the carbonyl contents of the thiazolidones themselves vary and are not always completely separable from the carbonyl developed in the polyethylene by photo-oxidation.

TABLE IX

STABILIZATION OF POLYETHYLENE WITH DERIVATIVES OF 4-THIAZOLIDONE

| 4-thiazolidone added (1%) | Stress-crack life, mos. | Initial elongation retained after 12 mo. exposure, percent | Carbonyl formation: arbitrary units |
|---|---|---|---|
| None (unstabilized control) | 12 | 16 | 37 |
| 2-phenylimino-3-phenyl-5-(3-n-octyloxy)benzal | >24 | 90 | 0 |
| 2-phenylimino-3-phenyl-5-(2-carbobutoxy)-benzal | >24 | 99 | 0 |
| 2-phenylimino-3-cetyl-5-(2-carbomethoxy)-benzal | >24 | 95 | 6 |
| 2-phenylimino-3-n-decyl-5-benzal | >24 | 92 | 0 |
| 2-phenylimino-3-n-hexyl-5-(2-methoxy)-benzal | >24 | 96 | 1 |
| 2-(4-tert-butylphenoxyphenylimino)-3-(4-tert-butylphenoxyphenyl)-5-benzal | >24 | 99 | 0 |
| 2-phenylimino-3-(2,4-di-tert-amylphenoxy-phenyl)-5-carbomethoxy)benzal | >24 | 95 | 8 |
| 2,phenylimino-3-cetyl-5-(4-methoxy)benzal | >24 | 96 | 4 |
| 2-keto-3-cetyl-5-benzal | >24 | 97 | 1 |
| 2-phenylimino-3-phenyl-5-amyloxy-benzoxy-benzal | >24 | 86 | 0 |
| 2-(2-ethylphenylimino)-3-(2-ethylphenyl)-5-(4-n-dodecyl)benzal | 20 | 64 | 0 |
| 2-cumylimino-3-cumyl-5-(2-carbobutoxy)-benzal | 18 | 93 | 0 |
| 2-(3-phenetylimino)-3-(3-phenetyl)-5-benzal | 16 | 38 | 0 |
| 2-ethylimino-3-ethyl-5-(2-thienyl) | 16 | 33 | >20 |
| 2-phenylimino-3-phenyl-5-(4-nitro)benzal | 16 | 68 | 9 |
| 2-phenylimino-3-phenyl-5-fural | 15 | 33 | 10 |
| 2-p-tolylimino-3-tolyl-5-cumal | 15 | 51 | 1 |
| 2-butylimino-3-butyl | 12 | 12 | >17 |

*Example 19*

A similar set of data for polypropylene is shown in Table X. Films 3-mil thick were cast from Tetralin dopes. A concentration of 5% was used for each thiazolidone tested. The density of the polypropylene was 0.915 and its inherent viscosity at 0.25% concentration in Tetralin at 145° C. was 1.53. The exposure times in the modified Weather-Ometer required to cause crease embrittlement in these films were recorded. The stabilization ratings listed in Table X are the ratios of embrittlement time for the stabilized film to embrittlement time for the unstabilized control film. The latter became brittle in about 25 hours.

TABLE X

| 4-thiazolidone added (5%): | Stabilization rating |
|---|---|
| None (unstabilized control) | 1.0 |
| 5-benzal-3-hexadecyl-2-phenylimino | 7.8 |
| 3-ethyl-5-(o-methoxybenzal)-2-phenylimino | 7.8 |
| 5-(m-hydroxybenzal)-3-phenyl-2-phenylimino | 7.5 |
| 5-benzal-3-butyl-2-phenylimino | 6.7 |
| 3-phenyl-2-phenylimino | 3.9 |
| 5-benzal-2-phenylimino | 3.5 |
| 3-ethyl-2-ethylimino-5-(2-thienyl) | 1.7 |

*Example 20*

The subject stabilizers were incorporated at 1% in an alkyd polyester prepared from 0.2 mole of phthalic anhydride, 0.2 mole maleic anhydride, 0.4 mole of propyleneglycol and 0.3 mole of styrene. Test pieces were pressed in the form of 1/16 in.-thick plates and exposed in the Weather-Ometer for 1000 hours. Yellowing was determined by optical density measurement at a wave length of 450 mμ. Table XI presents the data obtained.

TABLE XI

STABILIZATION OF AN ALKYD POLYESTER RESIN WITH DERIVATIVES OF 4-THIAZOLIDONE

| 4-thiazolidone added (1%): | Optical density [1] |
|---|---|
| None (unstabilized control) | 0.40 |
| 2 - phenylimino - 3 - phenyl - 5 - benzal - 4-thiazolidone | 0.22 |
| 2 - phenylimino - 3 - phenyl - 5 - (p - methoxybenzal)-4-thiazolidone | 0.18 |
| 2 - phenylimino - 3 - hexadecyl - 5 - benzal - 4-thiazolidone | 0.25 |
| 2-hexylimino-3-hexyl-5-benzal-4-thiazolidone | 0.28 |
| 2 - anisylimino - 3 - anisyl - 5 - anisylidene-4-thiazolidone | 0.15 |
| 2 - (o - tolylimino) - 3 - (o - tolyl) - 5 - anisylidene-4-thiazolidone | 0.16 |

[1] At λ 450 mμ after 1,000 hours' exposure.

Example 21

A polyester made from 1 mole of terephthalic acid and 1 mole of ethyleneglycol was extruded at 270° C., drafted 200% at 105° C. in each of two mutually perpendicular directions and heatset at 200° C. for 30 sec. to produce a crystalline film 3 mils thick. When exposed in the modified Weather-Ometer for 300 hours this film lost 60% of its initial elongation. A similar polyester was prepared with the addition of 1% of 2-(o-tolylimino)-3-(o-tolyl)-5-benzal-4-thiazolidone and was extruded, processed and exposed in the same way as the unstabilized film. This film lost only 10% of its initial elongation during the Weather-Ometer exposure.

Example 22

A polyester made from 1 mole of phosgene and 1 mole of the sodium phenolate of 2,2'-bis(p-hydroxyphenyl)-propane was cast in the form of 1-mil thick film from a methylene chloride dope. This film lost 75% of its initial elongation after 300 hours' exposure in the modified Weather-Ometer. To a sample of the same dope was added 1% of 2-anisylimino-3-anisyl-5-anisylidene-4-thiazolidone, based on the polyester content of the dope, and a similar film cast after thorough mixing of the dope. This film lost only 20% of its initial elongation after the same exposure.

Certain derivatives of 4-thiazolidone are specifically useful as light stabilizers because of their low volatility and low solubility. Losses from thin plastic shapes, such as fibers and films, are thus minimized. The low color of these stabilizers, usually in the pale yellow range, and freedom from color change on exposure to light is a further advantage. Their remarkably good heat stability makes it possible to subject them to high temperature fabricating processes which are out of the question for many organic stabilizers.

These thiazolidones may be used with many kinds of plastics to improve the light stability such as cellulose esters, polyesters, polystyrene, vinyls, polyethylene, and the like.

Unless otherwise indicated the temperatures given herein are centigrade.

This is a continuation-in-part of application Serial No. 637,100, filed January 30, 1957, now abandoned.

We claim:

1. A molded article essentially consisting of cellulose acetate butyrate and 1–5%, based on the weight of the cellulose acetate butyrate, of a thiazolidone having the formula:

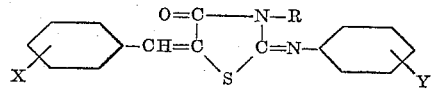

where X and Y are each selected from the group consisting of alkyl radicals containing one to twelve carbon atoms, alkoxy radicals containing one to twelve carbon atoms, halogen and nitro and R is selected from the group consisting of alkyl radicals containing two to twelve carbon atoms and aryl radicals substituted with substituents selected from the same group as X and Y.

2. A molded article essentially consisting of cellulose acetate butyrate and 1–5%, based on the weight of the cellulose acetate butyrate, of a thiazolidone having the formula:

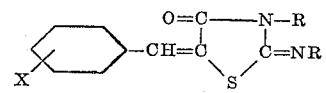

where X is selected from the group consisting of alkyl radicals containing one to twelve carbon atoms, alkoxy radicals containing one to twelve carbon atoms, halogen and nitro and R is selected from the group consisting of alkyl radicals containing two to twelve carbon atoms.

3. A molded article essentially consisting of cellulose acetate butyrate and 1–5% based on the weight of the cellulose acetate butyrate, of a thiazolidone having the formula:

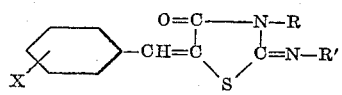

where R' is selected from the group consisting of alkyl radicals containing two to twelve carbon atoms and

X and Y are each selected from the group consisting of alkyl radicals having one to twelve carbon atoms, halogen and nitro and R is selected from the group consisting of alkyl radicals containing two to twelve carbon atoms and aryl radicals substituted with substituents selected from the same group as X and Y.

4. A molded article essentially consisting of cellulose acetate butyrate and about 1%, based on the weight of the cllulose acetate butyrate, of 2-phenylimino-3-phenyl-5-benzal 4-thiazolidone.

5. A molded article essentially consisting of cellulose acetate butyrate and about 1%, based on the weight of the cellulose acetate butyrate, of 2,4-diketo-5-(4'-butoxybenzal) 4-thiazolidone.

6. A molded article essentially consisting of cellulose acetate butyrate and about 1%, based on the weight of the cellulose acetate butyrate, of 5-(4'-isopropylbenzal)-2,4-diketo 4-thiazolidone.

References Cited in the file of this patent

UNITED STATES PATENTS

| 2,680,727 | Jarboe | June 8, 1954 |
| 2,739,888 | Sawdey | Mar. 27, 1956 |
| 2,739,971 | Sawdey | Mar. 27, 1956 |
| 2,808,330 | Sawdey | Oct. 1, 1957 |